US010195930B2

(12) United States Patent
Endo et al.

(10) Patent No.: US 10,195,930 B2
(45) Date of Patent: Feb. 5, 2019

(54) DRIVE UNIT FOR HYBRID VEHICLE

(71) Applicant: TOYOTA JIDOSHA KABUSHIKI KAISHA, Toyota-shi (JP)

(72) Inventors: Takahito Endo, Shizuoka-ken (JP); Yuji Iwase, Shizuoka-ken (JP); Hidekazu Nagai, Shizuoka-ken (JP); Kensei Hata, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 174 days.

(21) Appl. No.: 15/187,423

(22) Filed: Jun. 20, 2016

(65) Prior Publication Data
US 2016/0368361 A1 Dec. 22, 2016

(30) Foreign Application Priority Data

Jun. 18, 2015 (JP) .................................. 2015-123158

(51) Int. Cl.
*B60K 6/365* (2007.10)
*B60K 6/387* (2007.10)
(Continued)

(52) U.S. Cl.
CPC .............. *B60K 6/365* (2013.01); *B60K 6/387* (2013.01); *B60K 6/442* (2013.01); *B60K 6/445* (2013.01);
(Continued)

(58) Field of Classification Search
CPC ........ B60K 6/365; B60K 6/387; B60K 6/445; F16H 1/46; F16H 3/728;
(Continued)

(56) References Cited

U.S. PATENT DOCUMENTS

| 6,793,600 | B2 * | 9/2004 | Hiraiwa | B60K 6/365 |
| | | | | 475/5 |
| 7,128,677 | B2 * | 10/2006 | Supina | B60K 6/365 |
| | | | | 475/5 |

(Continued)

FOREIGN PATENT DOCUMENTS

| JP | 2005-170227 A | 6/2005 |
| JP | 3852321 | 9/2006 |

(Continued)

*Primary Examiner* — Roger L Pang
(74) *Attorney, Agent, or Firm* — Oblon, McClelland, Maier & Neustadt, L.L.P.

(57) ABSTRACT

A drive unit for a hybrid vehicle in which selectable operating modes are increased and power distribution ratio is changeable is provided. The drive unit comprises: a first planetary gear unit having a first input element to which power of an engine is applied, a first reaction element connected to a first motor, and a first output element; a second planetary gear unit that performs having a second input element connected to the first output element, a second output element connected to an output member, and a second reaction element; a first clutch that selectively connects any of the first input element and the first reaction element to the second reaction element; and a second clutch that selectively connects at least any of two elements of the second planetary gear unit to rotate the second planetary gear unit integrally.

6 Claims, 13 Drawing Sheets

(51) Int. Cl.
*B60K 6/445* (2007.10)
*F16H 3/72* (2006.01)
*B60K 6/442* (2007.10)
*B60W 20/40* (2016.01)
*F16H 1/46* (2006.01)
B60K 6/38 (2007.10)
F16H 37/08 (2006.01)

(52) U.S. Cl.
CPC .............. *B60W 20/40* (2013.01); *F16H 1/46* (2013.01); *F16H 3/728* (2013.01); *B60K 2006/381* (2013.01); *F16H 2037/0873* (2013.01); *F16H 2200/2007* (2013.01); *F16H 2200/2035* (2013.01); *Y02T 10/6239* (2013.01); *Y10S 903/911* (2013.01); *Y10S 903/912* (2013.01)

(58) Field of Classification Search
CPC ..... F16H 2200/2035; F16H 2200/2007; Y02T 10/6239; Y10S 903/912
USPC ............................................................ 475/5
See application file for complete search history.

(56) References Cited

U.S. PATENT DOCUMENTS

| | | | |
|---|---|---|---|
| 8,740,739 B2* | 6/2014 | Martin | B60K 6/547 180/65.265 |
| 8,894,525 B2* | 11/2014 | Sugino | B60K 6/365 475/5 |
| 2005/0221939 A1 | 10/2005 | Takami et al. | |
| 2008/0015073 A1 | 1/2008 | Raghavan et al. | |
| 2010/0081533 A1 | 4/2010 | Lee et al. | |
| 2013/0296089 A1* | 11/2013 | Kim | B60K 6/365 475/5 |
| 2015/0072819 A1* | 3/2015 | Ono | B60K 6/365 475/5 |
| 2016/0159341 A1 | 6/2016 | Tabata et al. | |
| 2018/0001757 A1* | 1/2018 | Oba | B60K 6/442 |

FOREIGN PATENT DOCUMENTS

| | | |
|---|---|---|
| JP | 2007-296881 A | 11/2007 |
| JP | 2012-192886 A | 10/2012 |
| JP | 5391959 | 10/2013 |
| JP | 2014-51146 | 3/2014 |
| JP | 2015-20486 A | 2/2015 |
| WO | WO 2013/114594 A1 | 8/2013 |
| WO | WO 2014/184852 A1 | 11/2014 |

* cited by examiner

|  | CL1 | CL2 |
|---|---|---|
| EV Mode | - | - |
| Hybrid Mode(High Mode) | ● | - |
| Hybrid Mode(Low Mode) | - | ● |
| Direct Mode | ● | ● |

- : Disengage  ● : Engage

|  | CL1 | CL2 |
|---|---|---|
| EV Mode | - | - |
| Hybrid Mode(Low Mode) | ● | - |
| Hybrid Mode(High Mode) | - | ● |
| Direct Mode | ● | ● |

- : Disengage  ● : Engage

DRIVE UNIT FOR HYBRID VEHICLE

CROSS REFERENCE TO RELATED APPLICATIONS

The present application claims the benefit of priority to Japanese Patent Application No. 2015-123158 filed on Jun. 18, 2015 with the Japanese Patent Office, the entire contents of which are incorporated herein by reference in its entirety.

BACKGROUND

Field of the Disclosure

Embodiments of the present disclosure relate to the art of a drive unit having an engine and a motor, and especially to a hybrid drive unit having an engine and two motors or motor-generators.

Discussion of the Related Art

JP-A-2014-51146 describes one example of the hybrid drive unit of this kind. According to the teachings of JP-A-2014-51146, an engine and a first motor for controlling an engine speed are connected to rotary elements of a first planetary gear unit serving as a power distribution device, and a second planetary gear unit serving as a transmission for changing torque of an output element of the first planetary gear unit is connected to the first planetary gear unit. The second planetary gear unit comprises an input element connected to the output element of the first planetary gear unit, a reaction element, an output element, a first engagement device selectively halting the reaction element, and a second engagement device selectively integrating the second planetary unit by connecting the reaction element with the input element.

In the hybrid vehicle having the power distribution device, the engine may be cranked by the first motor connected thereto. A torque of the motor for cranking the engine may be increased by a torque increasing device taught by Japanese Patent No. 3852321.

Japanese Patent No. 5391959 also describes the drive unit for a hybrid vehicle in which a transmission is placed on an output side of a power distribution device. According to the teachings of Japanese Patent No. 5391959, a planetary gear unit serving as a transmission comprises a fixed sun gear, a carrier as an input element, and a ring gear as an output element, a first clutch for connecting the ring gear with an output gear, a second clutch for connecting the carrier with the output gear, and a brake for halting the carrier. In the hybrid vehicle taught by Japanese Patent No. 5391959, an operating mode may be selected from EV mode in which the vehicle is powered by a second motor, a series mode in which the vehicle is powered by the second motor driven by an electric power generated by driving a first motor by the engine, and hybrid mode in which an engine torque is distributed to the first motor and to the output gear, and in which the vehicle is powered by torques of the output gear and the second motor.

In the hybrid drive unit taught by JP-A-2014-51146, the output element of the power distribution device is thus connected to the transmission adapted to shift a gear stage between a high stage and a low stage so that a drive torque or an output speed can be changed depending on the gear stage. In the hybrid drive unit of this kind, the first motor has to establish a reaction torque during generating the engine power and hence cannot be used to generate a torque for propelling the vehicle. That is, according to the teachings of JP-A-2014-51146, the vehicle cannot be powered by the engine and the first and the second motors simultaneously. Such operating mode to power the vehicle by all of the prime movers is also not available in the hybrid drive units taught by Japanese Patent Nos. 3852321 and 5391959.

SUMMARY

Aspects of the present disclosure have been conceived noting the foregoing technical problems, and it is therefore an object of the present application is to provide a drive unit for a hybrid vehicle to establish an operating mode for propelling the vehicle by an engine and two motors.

The present disclosure is applied to a drive unit for a hybrid vehicle, in which an output power of an engine is distributed to a first motor having a generating function and to an output member, and in which an output power of a second motor driven by an electric power generated by the first motor is added to a power delivered from the output member. In order to achieve the above-explained objective, according to a non-limiting embodiment, the drive unit is provided with: a first planetary gear unit that performs a differential action among a first input element to which the output power of the engine is applied, a first reaction element connected to the first motor, and a first output element; a second planetary gear unit that performs a differential action among a second input element connected to the first output element, a second output element connected to the output member, and a second reaction element; a first clutch that selectively connects any of the first input element and the first reaction element to the second reaction element; and a second clutch that selectively connects at least any of two elements of the second planetary gear unit to rotate the second planetary gear unit integrally.

In a non-limiting embodiment, the first planetary gear unit may be a single pinion planetary gear unit comprising a first sun gear, a first ring gear arranged concentrically with the first sun gear, and a first carrier supporting pinion gears meshing with the first sun gear and the first ring gear. Any one of the first sun gear and the first ring gear may serve as the first reaction element, and an other of the first sun gear and the first ring gear may serve as the first output element.

In a non-limiting embodiment, the second planetary gear unit may also be a single pinion planetary gear unit comprising a second sun gear, a second ring gear arranged concentrically with the second sun gear, and a second carrier supporting pinion gears meshing with the second sun gear and the second ring gear. The first ring gear may be connected to the second carrier, and the first clutch may be adapted to connect the first carrier to the second sun gear.

In a non-limiting embodiment, the first planetary gear unit and the second planetary gear unit may be arranged in tandem in an axial direction, and the first clutch and the second clutch may be arranged coaxially on opposite sides across the first planetary gear unit and the second planetary gear unit.

In a non-limiting embodiment, the drive unit may be further provided with a controller that controls the engine, the first motor, the second motor, the first clutch and the second clutch. Specifically, the controller may be configured to bring the first clutch and the second clutch into engagement, and to operate the engine, the first motor and the second motor in such a manner as to generate driving forces.

In a non-limiting embodiment, the drive unit may be further provided with a brake that selectively halts a rotation of the first input element.

Thus, according to the present application, the rotary elements of the first planetary gear unit and the second planetary gear unit are connected by bringing the first clutch into engagement to form a complex planetary gear unit. The complex planetary gear unit is rotated integrally by bringing the second clutch into engagement. Consequently, the engine and the first motor are connected directly to the output member to allow the first motor to generate driving force. For this reason, the operating mode to power the vehicle by the engine and the two motors can be established.

In addition, according to the embodiment in which a single-pinion planetary gear unit is used individually as the first and the second planetary gear units, and in which the first clutch and the second clutch are arranged coaxially across the first planetary gear unit and the second planetary gear unit, the connection between the rotary members or the connection between the rotary member and the clutch, the first motor or the engine may be simplified to downsize the drive unit.

Further, according to the embodiment in which the brake is employed to selectively halt rotation of the first input element, torque of the first motor can be delivered to the output member. For this reason, the vehicle can be powered by both of the first motor and the second motor.

BRIEF DESCRIPTION OF THE DRAWINGS

Features, aspects, and advantages of exemplary embodiments of the present disclosure will become better understood with reference to the following description and accompanying drawings, which should not limit the invention in any way.

DETAILED DESCRIPTION OF THE PREFERRED EMBODIMENTS

Figures 1, 2:
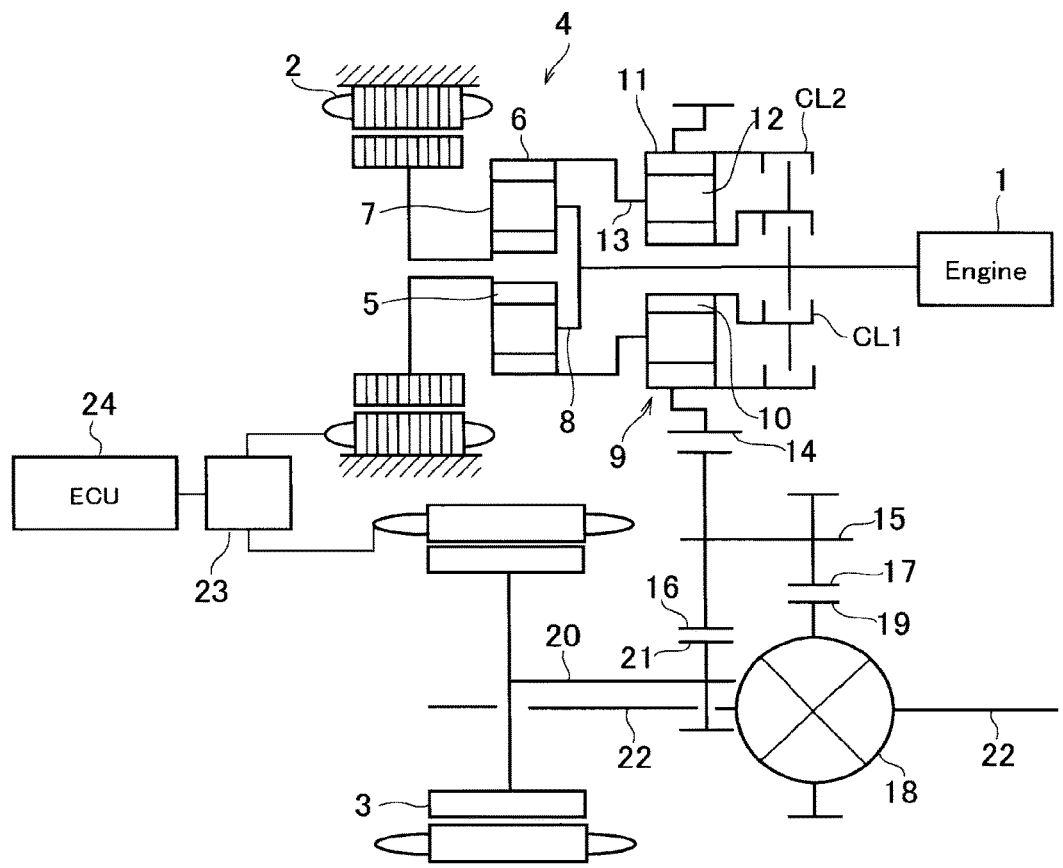
FIG. 1 is a schematic diagram showing a first embodiment of the drive unit according to the present application.
FIG. 2 is a table showing engagement states of the clutches of the drive unit shown in FIG. 1 under each operating mode.

Preferred embodiments of the present application will now be explained with reference to the accompanying drawings. Referring now to FIG. 1, there is shown the first embodiment of the drive unit according to the present application which can be applied to both front-engine, front-wheel-drive layout vehicle (i.e., FF layout vehicle), and front-engine, rear-wheel-drive layout vehicle (i.e., FR layout vehicle). The drive unit according to the preferred embodiment is provided with an engine 1, a first motor 2 and a second motor 3. Specifically, the first motor 2 is a motor-generator having a generating function (abbreviated as "MG1" in the nomographic diagrams). In the drive unit according to the first embodiment, a speed of the engine 1 is controlled by the first motor 2, and the second motor 3 is driven by an electric power generated by the first motor 2 to generate a driving force for propelling the vehicle. Optionally, the motor-generator having a generating function may also be used as the second motor 3 (abbreviated as "MG2" in the nomographic diagrams).

A power distribution device 4 as a first planetary gear unit is adapted to distribute power of the engine 1 to the first motor 2 side and to an output side. To this end, a single-pinion planetary gear unit adapted to perform a differential action among three rotary elements is used as the power distribution device 4. Specifically, the power distribution device 4 comprises a first sun gear 5 as an external gear, a first ring gear 6 as an internal gear arranged concentrically with the first sun gear 5, pinion gears 7 interposed between the first sun gear 5 and the first ring gear 6 while being meshed with both gears 5 and 6, and a first carrier 8 supporting the pinion gears 7 in a rotatable manner. Accordingly, the first sun gear 5 serves as a first reaction element, the first ring gear 6 serves as a first output element, and the first carrier 8 serves as a first input element.

An output shaft of the engine 1 is connected to an input shaft connected to the first carrier 8 so that power of the engine 1 is applied to the first carrier 8. Optionally, an additional gear unit may be interposed between the input shaft and the first carrier 8, and a damper device and a torque converter may be interposed between the output shaft and the input shaft.

The first sun gear 5 is connected to a rotor of the first motor 2. According to the embodiment shown in FIG. 1, the first motor 2 is arranged concentrically with the power distribution device 4 on an opposite side of the engine 1 across the power distribution device 4. A single-pinion second planetary gear unit 9 as a transmission is interposed coaxially between the power distribution device 4 and the engine 1. Specifically, the second planetary gear unit 9 comprises a second sun gear 10 as an external gear, a second ring gear 11 as an internal gear arranged concentrically with the second sun gear 10, pinion gears 12 interposed between the second sun gear 10 and the second ring gear 11 while being meshed with both gears 10 and 11, and a second carrier 13 supporting the pinion gears 12 in a rotatable manner. Accordingly, the second sun gear 10 serves as a second reaction element, the second ring gear 11 serves as a second output element, and the second carrier 13 serves as a second input element. In the second planetary gear unit 9, the second carrier 13 is connected to the first ring gear 6 of the power distribution device 4, and the second ring gear 11 is connected to an output gear 14 as an output member.

In order to use the power distribution device 4 and the second planetary gear unit 9 as a complex planetary gear unit, a first clutch CL1 is disposed to selectively connect the second sun gear 10 as a reaction element of the second planetary gear unit 9 with the first carrier 8 as the reaction element of the power distribution device 4. To this end, for example, a wet-type multiple plate clutch, a dog clutch etc. may be used as the first clutch CL1. Thus, in the drive unit shown in FIG. 1, the power distribution device 4 is connected to the second planetary gear unit 9 to serve as a complex planetary gear unit by bringing the first clutch CL1 into engagement. In the complex planetary gear unit thus formed, the first carrier 8 of the power distribution device 4 is connected to the second sun gear 10 of the second planetary gear unit 9 to serve as an input element, the first sun gear 5 of the power distribution device 4 serves as a reaction element, and the second ring gear 11 of the second planetary gear unit 9 serves as an output element.

A second clutch CL2 is disposed to rotate the second planetary gear unit 9 integrally. For example, a friction clutch and a dog clutch may be used as the second clutch CL2 to selectively connect the second sun gear 10 to the first carrier 8 or the second ring gear 11, or to connect the first carrier 8 to the second ring gear 11. In the drive unit shown in FIG. 1, specifically, the second clutch CL2 is adapted to connect the second sun gear 10 to the second ring gear 11 of the second planetary gear unit 9. For this purpose, the first clutch CL1 and the second clutch CL2 are arranged coaxially with the power distribution device 4 and the second planetary gear unit 9 on the opposite side of the power distribution device 4 across the second planetary gear unit 9. The first clutch CL1 and the second clutch CL2 may be arranged not only in parallel to each other in a radial direction but also in tandem in an axial direction. In the drive unit shown in FIG. 1, first clutch CL1 and the second clutch CL2 are arranged parallel to each other and hence an axial length of the drive unit can be shortened. By contrast, a width of the drive unit will not be widened by the clutches CL1 and CL2 and hence number of friction plates of the frictional clutch can be reduced.

A counter shaft 15 extends parallel to a common rotational axis of the engine 1, the power distribution device 4 and the second planetary gear unit 9. A driven gear 16 is fitted onto one end of the counter shaft 15 to be meshed with the output gear 14, and a drive gear 17 is fitted onto the other end of the counter shaft 15 to be meshed with a ring gear 19 of a differential gear unit 18 as a final reduction. The driven gear 16 is also meshed with a drive gear 21 fitted onto a rotor shaft 20 of the second motor 3 so that power or torque of the second motor 3 is synthesized with power or torque of the output gear 14 at the driven gear 16 to be distributed from the differential gear unit 18 to both drive shafts 22.

The first motor 2 and the second motor 3 are individually connected to an electric power source 23 comprising a battery and an inverter or a converter (both not shown). The electric power source 23 is controlled by an electronic control unit (abbreviated as the "ECU" hereinafter) 24 as a controller composed mainly of a microcomputer. For example, the ECU 24 may operate the first motor 2 as a generator while driving the second motor 3 as a motor by an electric power generated by the first motor 2. Otherwise, the ECU 24 may also operate both of the first motor 2 and the second motor 3 as motors to generate driving force by supplying the electric power from the electric power source 23. The second motor 3 may also be used as a generator during decelerating the vehicle, and in this case, electric power generated by the second motor 3 may be stored into the electric power source 23. The ECU 24 is further configured to control the engine 1 and the clutches CL1 and CL2.

Figure 3:
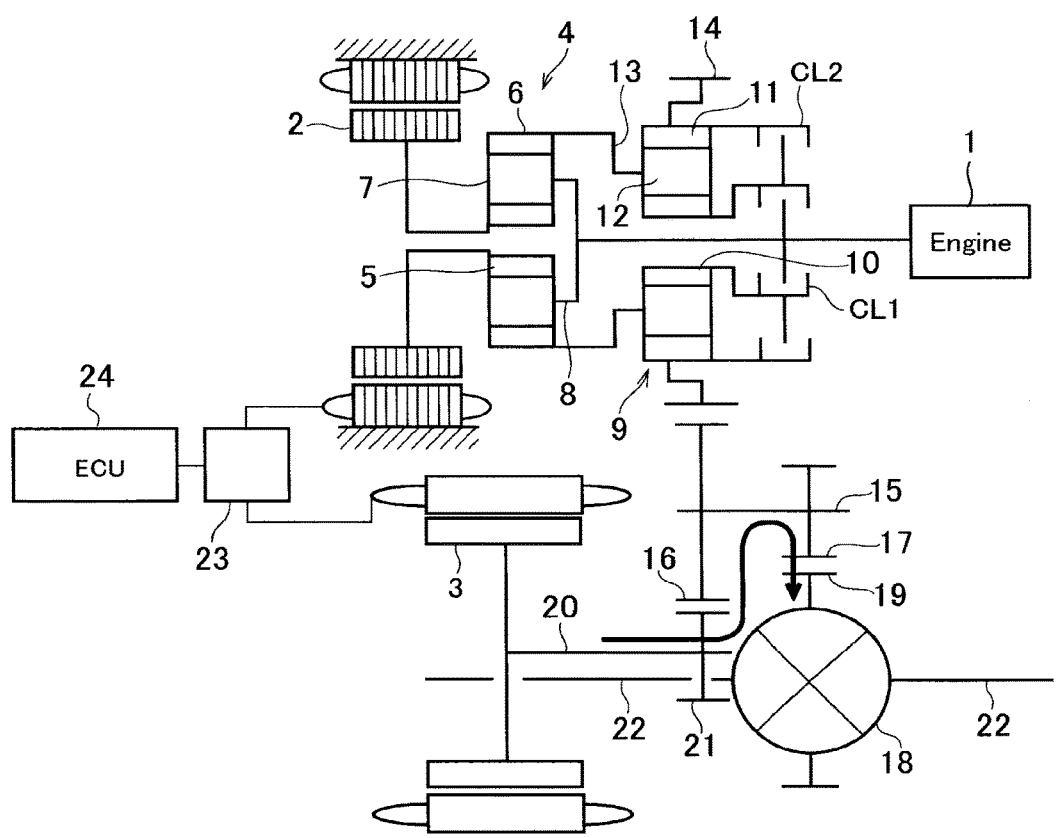
FIG. 3 is a schematic diagram showing a torque transmitting condition in the drive unit shown in FIG. 1 under the EV mode.

An operating mode of the drive unit may be selected from four modes by controlling the clutches CL1 and CL2, the engine 1, and the motors 2 and 3. Engagement states of the clutches CL1 and CL2 under each operating mode are shown in FIG. 2. The electric vehicle mode (abbreviated as the "EV mode" hereinafter) is established by bringing both of the clutches CL1 and CL2 into disengagement. In the EV mode, the second motor 3 is operated as a motor by the electric power supplied from the electric power source 23 while the engine 1 and the first motor 3 are stopped. A torque transmitting condition in the EV mode is indicated in FIG. 3. Under the EV mode, torque of the second motor 3 is delivered to the counter shaft 15 via the drive gear 21 and the driven gear 16, and further delivered to the differential unit 18 from the drive gear 17 via the ring gear 19. In this situation, the output gear 14 and the second ring gear 11 integral therewith are rotated by a rotation of the driven gear 16, but the second sun gear 10 is idled by bringing the clutches CL1 and CL2 into disengagement. That is, the second carrier 13 and the first ring gear 6 of the power distribution device 4 connected thereto are not rotated. For this reason, the first motor 2 and the engine 1 will not be rotated passively and hence power loss can be reduced to improve energy efficiency.

Figure 4:
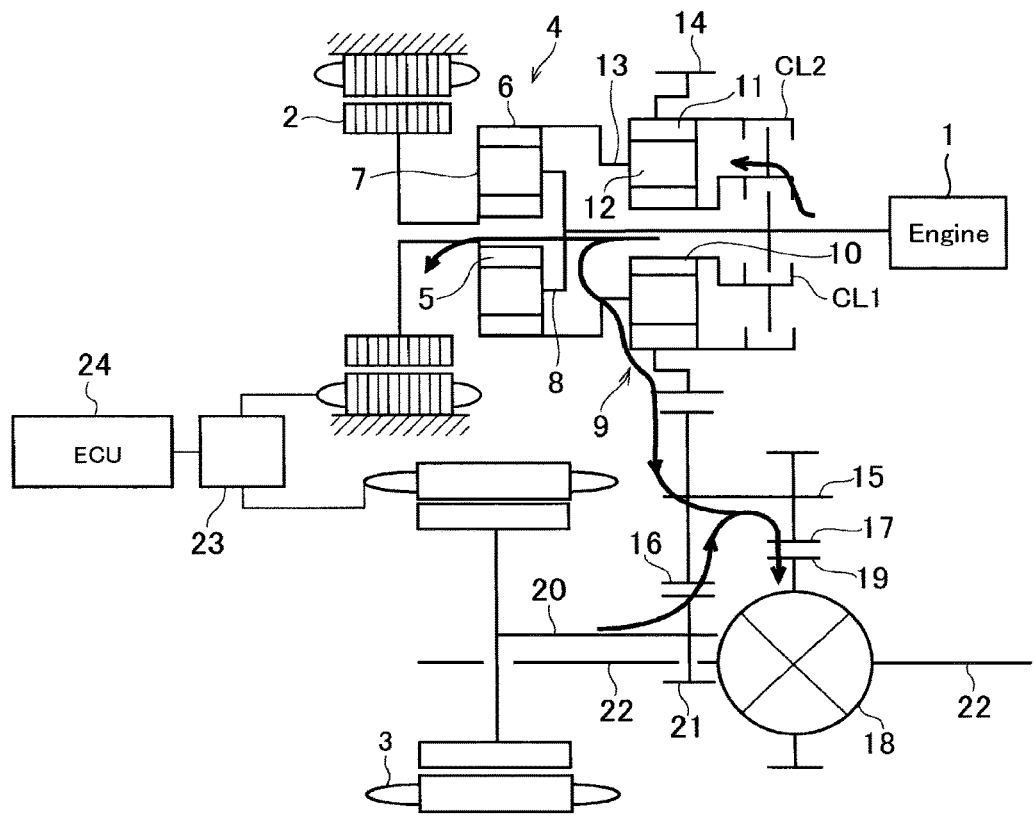
FIG. 4 is a schematic diagram showing a torque transmitting condition in the drive unit shown in FIG. 1 under the high mode of the hybrid mode.

The hybrid mode can be selected from the high mode (indicated as "Hi" in FIG. 2) and the low mode (indicated as "Lo" in FIG. 2). Specifically, the high mode is established by bringing only the first clutch CL1 into engagement. As described, the power distribution device 4 is connected to the second planetary gear unit 9 to serve as a complex planetary gear unit by connecting the first carrier 8 to the second sun gear 10. Under the hybrid mode, the vehicle is powered by the engine 1, and a torque transmitting condition under the hybrid mode is indicated in FIG. 4. In this case, as indicated in FIG. 4, power of the engine 1 is distributed to the first carrier 8 of the power distribution device 4 and to the second sun gear 10 of the second planetary gear unit 9. In the power distribution device 4, the power delivered to the first carrier 8 is further distributed to the first sun gear 5 and to the first ring gear 6. Consequently, the first motor 2 is rotated by the power distributed to the first sun gear 5 to generate electric power, and a counter torque (opposite to the rotational direction of the engine 1) is applied to the first sun gear 5. Meanwhile, the power of the first ring gear 6 of the power distribution device 4 is delivered to the second carrier 13 of the second planetary gear unit 9, and further delivered to the second ring gear 11 together with the power delivered to the second sun gear 10. Then, the power delivered to the second ring gear 11 of the second planetary gear unit 9 is further delivered to the differential gear unit 18 through the driven gear 16, the counter shaft 15, and the drive gear 17.

In this situation, the second motor 3 is driven as a motor by the electric power generated by the first motor 3, and the power generated by the second motor 3 is delivered to the driven gear 16 via the drive gear 21. Thus, the power converted into the electric power is converted again into a mechanical power to be added to the output power of the output gear 14.

Figure 5:
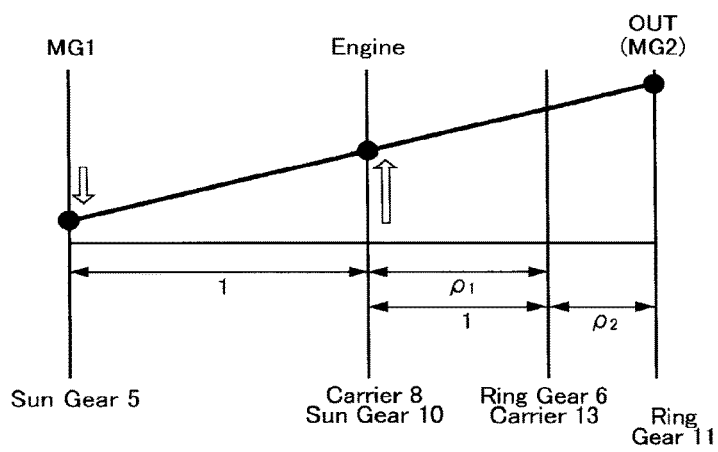
FIG. 5 is a nomographic diagram showing a situation under the high mode.

An operating condition of the drive unit under the high mode is indicated in the nomographic diagram shown in FIG. 5. In the nomographic diagram, each clearance between vertical lines representing rotary elements individually indicates a gear ratio between the rotary elements, and a distance between a horizontal line and each dot on the vertical line individually indicates a rotational speed and direction of each of the rotary element. As described, in the complex planetary gear unit, the first carrier 8 connected to the second sun gear 10 by the first clutch CL1 serves as an input element to which the power of the engine 1 is applied, and the first sun gear 5 serves as a reaction element that is subjected to a counter torque resulting from generating electric power by the first motor 2. In the situation shown in FIG. 5, the rotational speed of the sun gear 5 is lower than that of the first carrier 8 connected to the second sun gear 10 (or lower than the engine speed), and the rotational speed of the second ring gear 11 is raised to be higher than that of the first carrier 8 connected to the second sun gear 10. Consequently, a speed ratio between an input speed and an output speed is reduced to be smaller than "1" so that the vehicle is brought into an overdriving condition. In this situation, given that the power of the engine 1 distributed to the first motor 2 is "1", a distribution ratio of the engine power between the first motor 2 and the ring gear 11 can be expressed as "1/(ρ1+ ρ1·ρ2)", where "ρ1" is a gear ratio of the power distribution device 4 between teeth numbers of the first ring gear 6 and the first sun gear 5, and "ρ2" is a gear ratio of the second planetary gear unit 9 between teeth numbers of the second ring gear 11 and the second sun gear 10.

Figure 6:
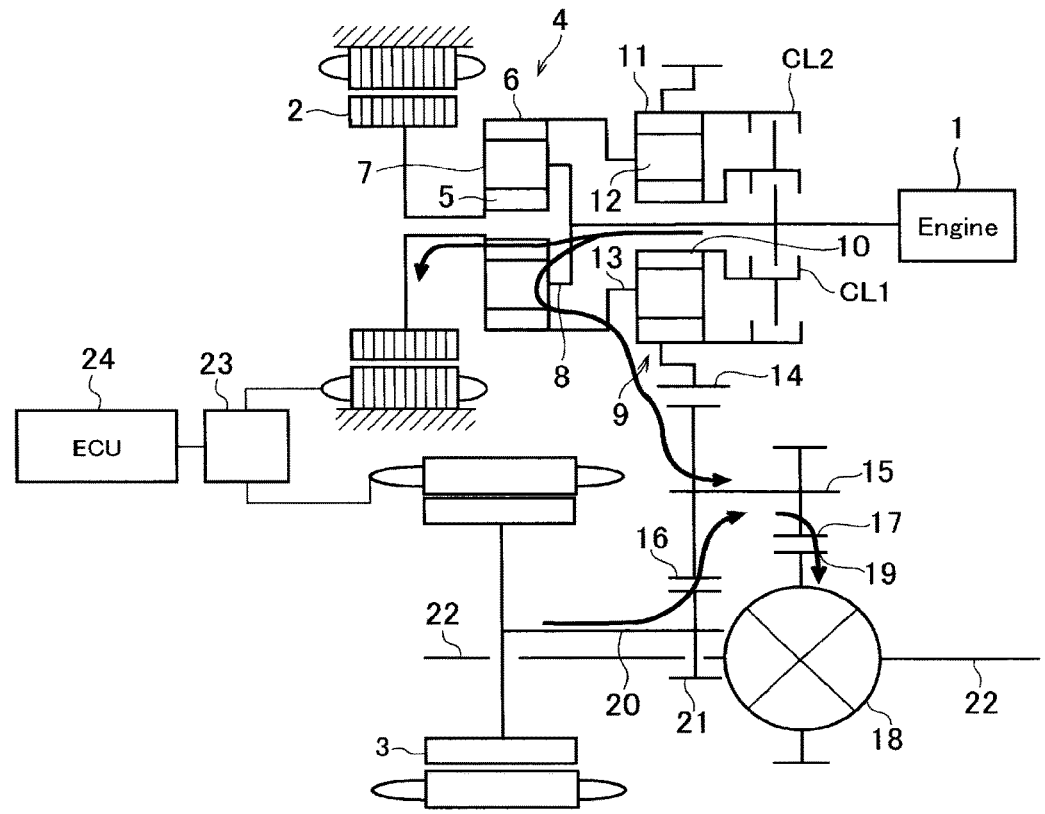
FIG. 6 is a schematic diagram showing a torque transmitting condition under the low mode of the hybrid mode in the drive unit shown in FIG. 1.

The Low mode is established by bringing the first clutch CL1 into disengagement while bringing the second clutch CL2 into engagement, and a torque transmitting condition under the low mode is shown in FIG. 6. In the low mode, the first clutch CL1 is thus brought into disengagement and hence only the first ring gear 6 of the power distribution device 4 is connected to the second carrier 13 of the second planetary gear unit 9. In the low mode, therefore, the power of the engine 1 distributed to the first ring gear 6 is delivered to the second carrier 13 of the second planetary gear unit 9. In this situation, the second clutch CL2 is brought into engagement and hence the second sun gear 10 is connected to the second ring gear 11 to rotate the second planetary gear unit 9 integrally. That is, the power of the first ring gear 6 of the power distribution device 4 is delivered to the output gear 14 without being changed by the second planetary gear unit 9. Then, the output power of the output gear 14 is delivered to the differential gear unit 18 though the driven gear 16, the counter shaft 15, and the drive gear 17.

In this situation, the second motor 3 is also driven as a motor by the electric power generated by the first motor 3, and the power generated by the second motor 3 is delivered to the driven gear 16 via the drive gear 21. Thus, the power converted into the electric power is also converted again into a mechanical power to be added to the output power of the output gear 14.

Figure 7:
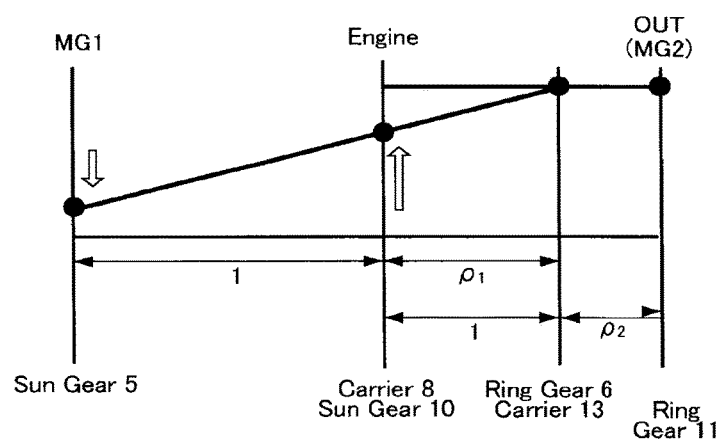
FIG. 7 is a nomographic diagram showing a situation under the low mode.

An operating condition of the drive unit under the low mode is indicated in the nomographic diagram shown in FIG. 7. In the low mode, the power distribution device 4 is disconnected from the second planetary gear unit 9, and the power is delivered from the first ring gear 6 as an output element of the power distribution device 4 to the second planetary gear unit 9. As described, since the second planetary gear unit 9 is rotated integrally in the low mode, the second ring gear 11 as an output element is rotated at a same speed as the second carrier 13 as an input element, and hence the power of the first ring gear 6 of the power distribution device 4 is delivered to the output gear 14 without being changed by the second planetary gear unit 9. Under the low mode, therefore, rotational speed of the output gear 14 is lowered in comparison with that under the High mode at same rotational speeds of the engine 1 and the first motor 2. For this reason, the speed ratio is increased in the amount of reduction in the rotational speed of the output gear 14. In this case, the power of the engine 1 is distributed only by the power distribution device 4, and given that the power of the engine 1 distributed to the first motor 2 is "1", the distribution ratio of the engine power under the low mode can be expressed as "1/ρ1".

Figure 8:
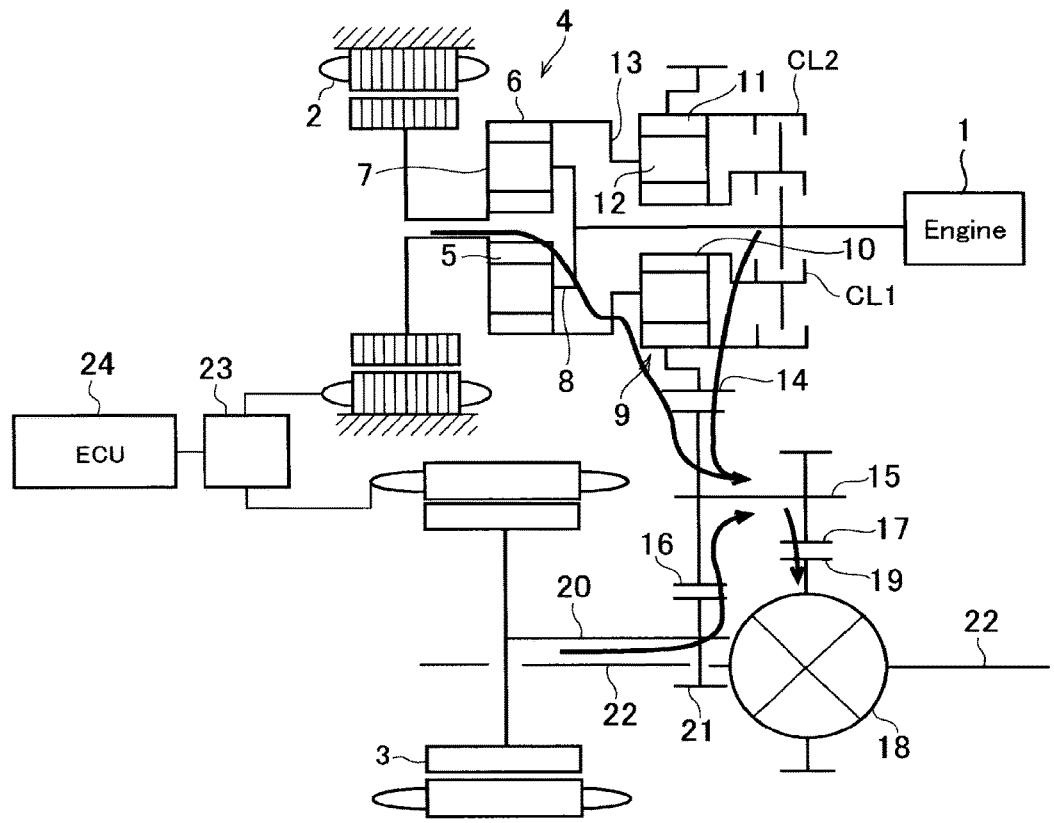
FIG. 8 is a schematic diagram showing a torque transmitting condition in the drive unit shown in FIG. 1 under the direct mode.
Figure 9:
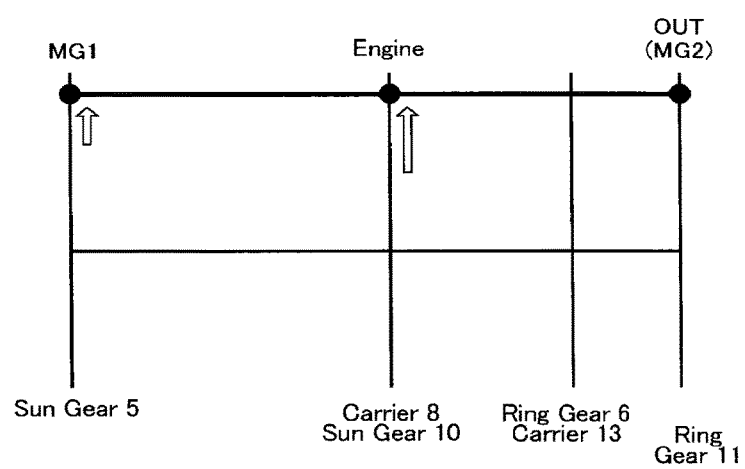
FIG. 9 is a nomographic diagram showing a situation under the direct mode.

The direct mode is established by bringing both of the first clutch CL1 and the second clutch CL2 into engagement. A torque transmitting condition under the direct mode is shown in FIG. 8, and an operating condition of the drive unit under the direct mode is indicated in the nomographic diagram shown in FIG. 9. In the direct mode, since the first clutch CL1 and the second clutch CL2 are brought into engagement, the second planetary gear unit 9 is rotated integrally, and the second sun gear 10 of the second planetary gear unit is connected to the engine 1. In this situation, therefore, power of the engine 1 is delivered directly to the output gear 14 through the second planetary gear unit 9. Meanwhile, in the power distribution device 4, the first carrier 8 is connected to the engine, and the first ring gear 6 is also connected to the engine 1 through the second planetary gear unit 9 and the first clutch CL1. That is, the power distribution device 4 is also rotated integrally without performing a differential action so that an output torque of the first motor 2 driven as a motor by the electric power from the electric power source 23 is delivered to the output gear 14 without being changed. Thus, in the direct mode, the power generated by the engine 1 and the power generated by the first motor 2 are synthesized at the output gear 14. In this case, the second motor 3 is also driven as a motor by the electric power from the electric power source 23, and output power of the second motor 3 is synthesized with the powers of the first motor 2 and the engine 1 at the driven gear 16. That is, all of the engine 1, the first motor 2 and the second motor 3 are driven to generate driving forces to be delivered to the drive shafts 22 through the differential gear unit 18. In other words, under the direct mode, the hybrid vehicle is allowed to be propelled by a largest driving force generated utilizing the fuel and the electric energy stored in the electric power source 23. In addition, as shown in FIG. 9, the rotary elements of the power distribution device 4 and the second planetary gear unit are not rotated relatively under the direct mode. For this reason, an energy loss can be reduced to improve energy efficiency.

Figures 10, 11:
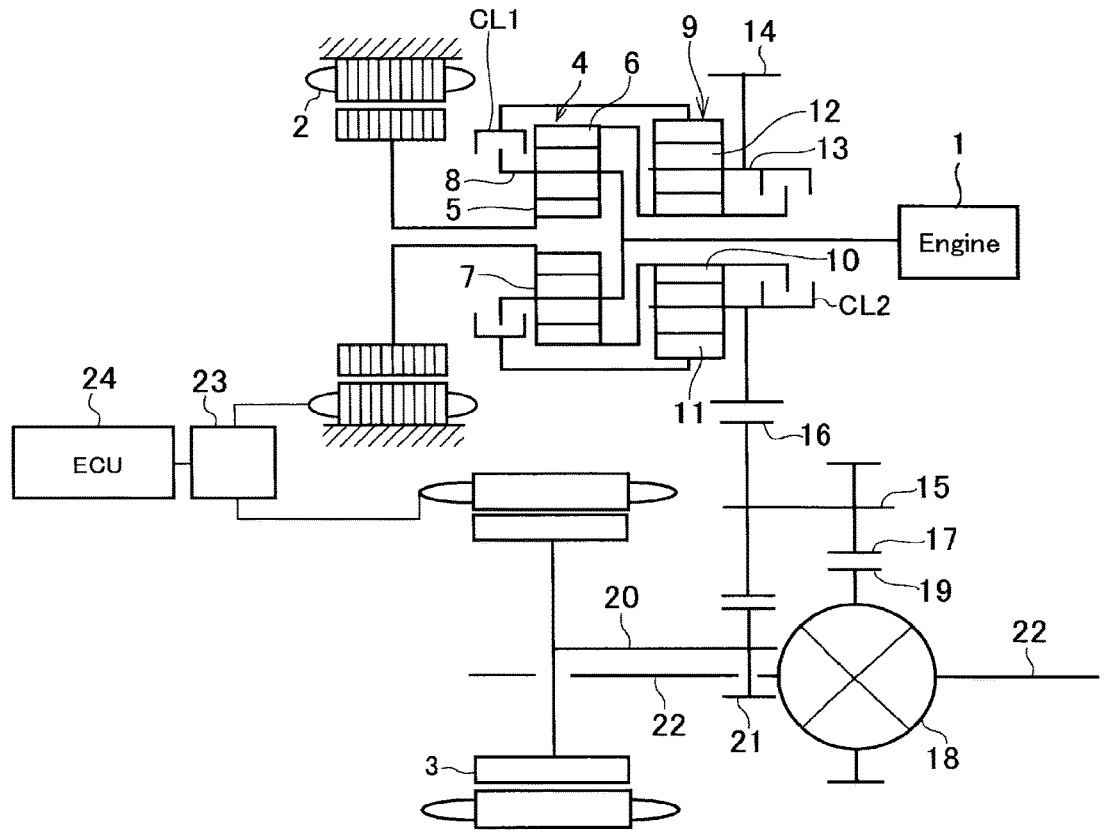
FIG. 10 is a schematic diagram showing second embodiment of the drive unit according to the present application.
FIG. 11 is a table showing engagement states of the clutches of the drive unit shown in FIG. 10 under each operating mode.

Thus, in the drive unit shown in FIG. 1, the power distribution device 4 and the second planetary gear unit 9 are combined to form the complex planetary gear unit to alter the power distribution ratio by connecting the first ring gear 6 to the second carrier 13 while connecting the first carrier 8 to the second sun gear 10. Turning to FIG. 10, there is shown a second embodiment of the drive unit in which arrangements of the first clutch CL1 and the second clutch CL2 are altered to connect the power distribution device 4 to the second planetary gear unit 9.

According to the second embodiment shown in FIG. 10, the first ring gear 6 of the power distribution device 4 is connected to the second sun gear 10 of the second planetary gear unit 9. The first clutch CL1 is disposed between the power distribution device 4 and the first motor 2 to selectively connect the first carrier 8 of the power distribution device 4 to the second ring gear 11 of the second planetary gear unit 9. According to the second embodiment, therefore, the second sun gear 10 of the second planetary gear unit 9 serves as a second input element. The output gear 14 is connected to the second carrier 13 of the second planetary gear unit 9 to serve as a second output element, and the second ring gear 11 of the second planetary gear unit 9 serves as a second reaction element. On the other hand, the second clutch CL2 is disposed between the engine 1 and the second planetary gear unit 9 to selectively connect the second sun gear 10 to the second carrier 13. The remaining structures are similar to those of the drive unit shown in FIG. 1, and detailed explanations for the common elements will be omitted by allotting common reference numerals thereto.

An operating mode of the drive unit shown in FIG. 10 may also be selected from the EV mode, the high mode of hybrid mode, the low mode of hybrid mode and the direct mode, and engagement states of the clutches CL1 and CL2 under each operating mode are shown in FIG. 11. As shown in FIG. 11, in the drive unit shown in FIG. 10, the low mode of the hybrid mode is established by bringing the first clutch CL1 into engagement, and the high mode of the hybrid mode is established by bringing the second clutch CL2 into engagement. Thus, the clutches CL1 and CL2 are brought into engagement in an opposite manner as compared to the drive unit shown in FIG. 1. The engagement states of the clutches CL1 and CL2 under the EV mode and the direct mode in the drive unit shown in FIG. 10 are identical to those in the drive unit shown in FIG. 1.

Figure 12:
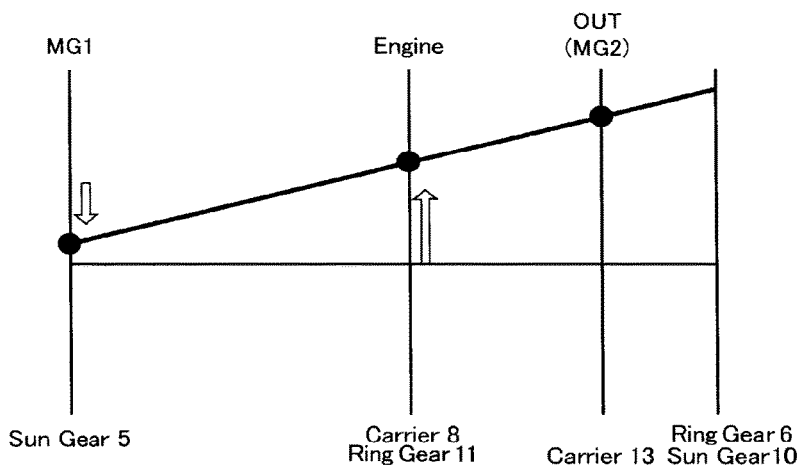
FIG. 12 is a nomographic diagram showing a situation in the drive unit shown in FIG. 10 under the high mode.

An operating condition of the drive unit shown in FIG. 10 under the low mode is indicated in the nomographic diagram shown in FIG. 12. As described, in the drive unit shown in FIG. 10, the second carrier 13 of the second planetary gear unit 9 serves as an output element of the complex planetary gear unit of the power distribution device 4 and the second planetary gear unit 9. As indicated in FIG. 12, under the low mode, a rotational speed of the second carrier 13 is lower than that of the first ring gear 6 of the power distribution device 4 connected to the second sun gear 10 of the second planetary gear unit 9. In this case, given that the power of the engine 1 distributed to the first motor 2 is "1", the distribution ratio of the engine power to the output gear 14 can be expressed as "$(1+\rho2)/(\rho1 \cdot \rho2)$".

Figure 13:
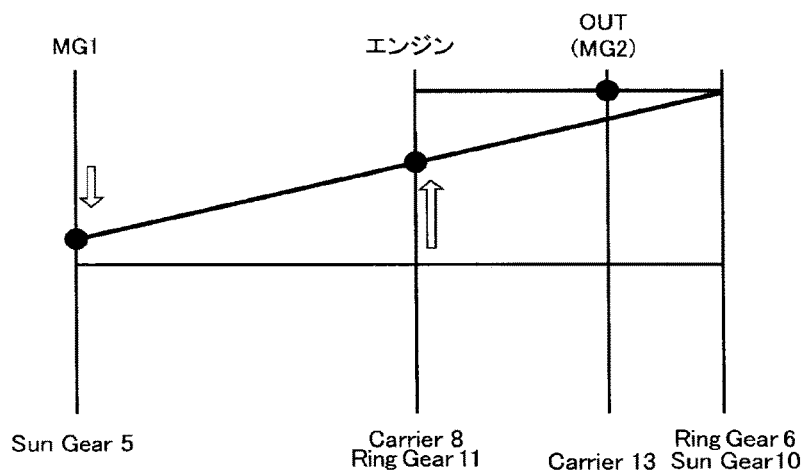
FIG. 13 is a nomographic diagram showing a situation in the drive unit shown in FIG. 10 under the low mode.

An operating condition of the drive unit shown in FIG. 10 under the high mode is indicated in the nomographic diagram shown in FIG. 13. In the high mode, the second clutch CL2 is brought into disengagement so that the second planetary gear unit 9 is rotated integrally. In this situation, the power is delivered from the first ring gear 6 of the power distribution device 4 to the second planetary gear unit 9. Consequently, a rotational speed of the second carrier 13 of the second planetary gear unit 9 integral with the output gear 14 is increased to a same speed as the first ring gear 6 of the power distribution device 4 connected to the second sun gear 10 of the second planetary gear unit 9. Under the high mode, therefore, a rotational speed of the output gear 14 is raised in comparison with that under the low mode at same rotational speeds of the engine 1 and the first motor 2. For this reason, the speed ratio is decreased in the amount of increase in the rotational speed of the output gear 14. In this case, given that the power of the engine 1 distributed to the first motor 2 is "1", the distribution ratio of the engine power to the output gear 14 can also be expressed as "$1/\rho1$".

Figure 14:
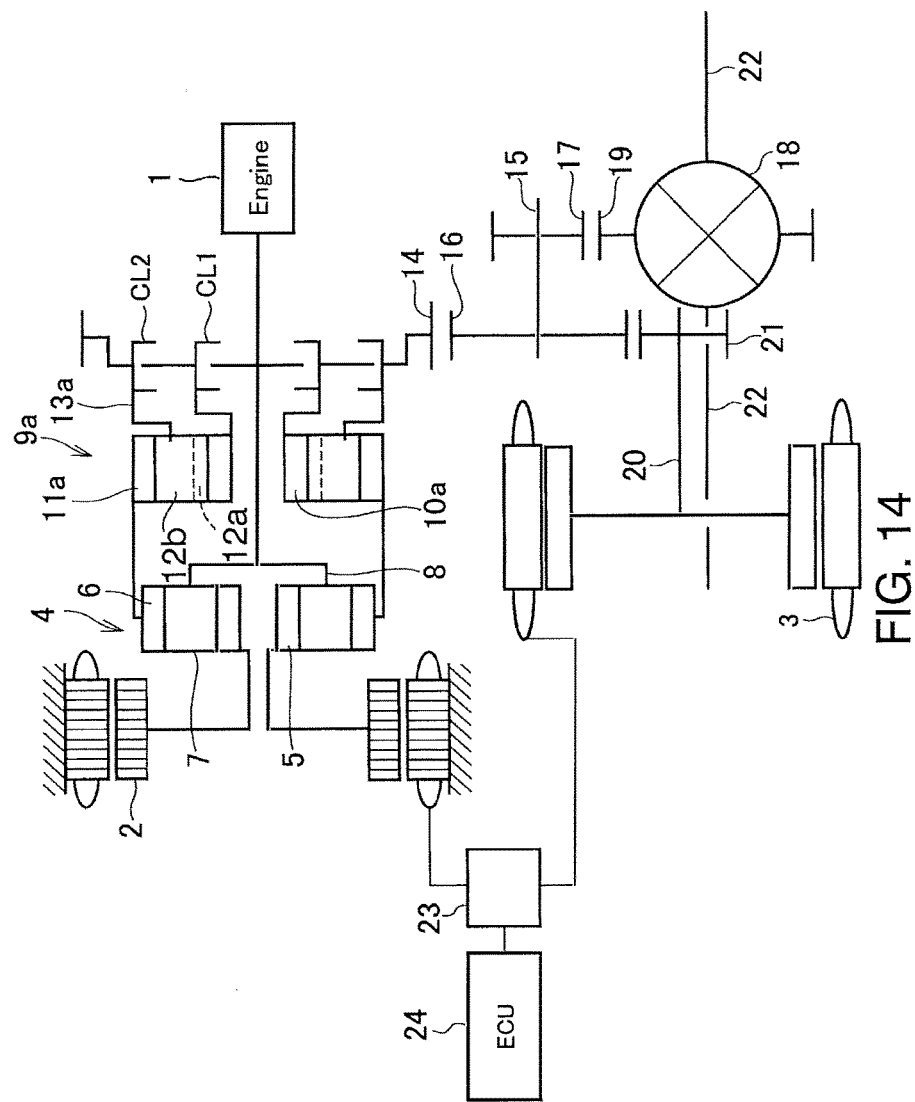
FIG. 14 is a schematic diagram showing third embodiment of the drive unit according to the present application in which a double-pinion planetary gear unit is used as the second planetary gear unit.

In the drive unit according to the preferred embodiment, a double-pinion planetary gear unit may also be used instead of the single-pinion planetary gear unit. Turning to FIG. 14, there is shown a third example in which a double-pinion planetary gear unit is used as the second planetary gear unit 9a. Specifically, the second planetary gear unit 9a comprises a second sun gear 10a, first pinion gears 12a meshed with the second sun gear 10a, second pinion gears 12b interposed between the first pinion gears 12a and a second ring gear 11a, and a second carrier 13a supporting the first pinion gears 12a and the second pinion gears 12b. In the drive unit shown in FIG. 14, the second ring gear 11a of the second planetary gear unit 9a is connected to the first ring gear 6 of the power distribution device 4 to serve as a second input element. The second carrier 13a of the second planetary gear unit 9a is connected to the output gear 14 to serve as a second output element. The second clutch CL2 is adapted to selectively connect the second carrier 13a to the second sun gear 10a serving as a second reaction element. The remaining structures are similar to those of the drive unit shown in FIG. 1, and detailed explanations for the common elements will be omitted by allotting common reference numerals thereto.

An operating mode of the drive unit shown in FIG. 14 may also be selected from the EV mode, the high mode of hybrid mode, the low mode of hybrid mode and the direct mode, and engagement states of the clutches CL1 and CL2 under each operating mode are identical to those shown in FIG. 2. Specifically, the EV mode is established by bringing both of the clutches CL1 and CL2 into disengagement, and the direct mode is established by bringing both of the clutches CL1 and CL2 into engagement. Likewise, in the hybrid mode, the high mode is established by bringing the first clutch CL1 into engagement, and the low mode is established by bringing the second clutch CL2 into engagement. Operating condition of the drive unit shown in FIG. 14 under the EV mode and the direct mode are similar to those of the drive unit shown in FIG. 1.

Figure 15:
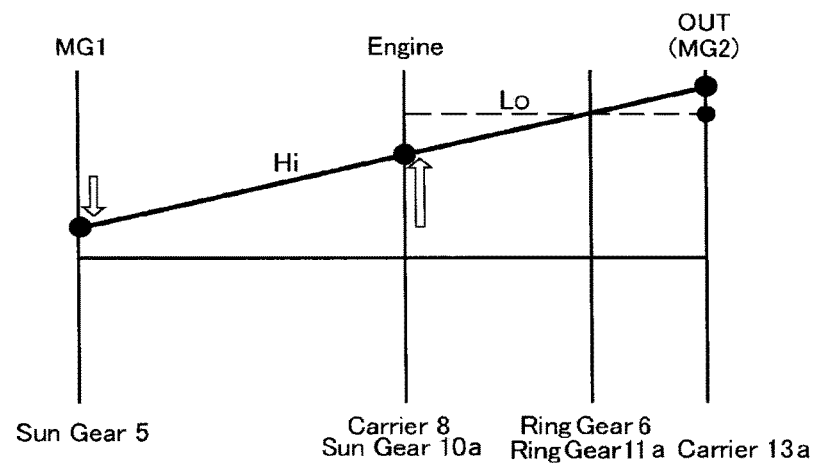
FIG. 15 is a nomographic diagram showing a situation in the drive unit shown in FIG. 14 under the high mode and the low mode.

Operating conditions of the drive unit shown in FIG. 14 under the high mode and the low mode are indicated in the nomographic diagram shown in FIG. 15. In FIG. 15, the solid line represents the high mode, and the dashed line represents the low mode. In the high mode, the first clutch CL1 is brought into engagement so that the first carrier 8 of the power distribution device 4 is connected to the second sun gear 10a of the second planetary gear unit 9a to combine the power distribution device 4 with the second planetary gear unit 9a. In this situation, the first carrier 8 connected to the second sun gear 10a serves as an input element, and the second carrier 13a serves as an output element of the complex planetary gear unit. In this case, given that the power of the engine 1 distributed to the first motor 2 is "1", the distribution ratio of the engine power to the output gear 14 can be expressed as "$(1-\rho2)/\rho1$".

In the low mode, the second clutch CL2 is brought into engagement so that the second planetary gear unit 9a is rotated integrally. In this situation, the power is delivered from the first ring gear 6 of the power distribution device 4 to the second planetary gear unit 9a. Consequently, a rotational speed of the second carrier 13a of the second planetary gear unit 9a serving as an output element is lowered to a same speed as the first ring gear 6 of the power distribution device 4. Under the low mode, since a rotational speed of the second carrier 13a is thus lowered in comparison with that under the high mode, the speed ratio is increased in the amount of such reduction in the rotational speed of the second carrier 13a. In this case, given that the power of the engine 1 distributed to the first motor 2 is "1", the distribution ratio of the engine power to the output gear 14 can also be expressed as "$1/\rho 1$".

Figure 16:
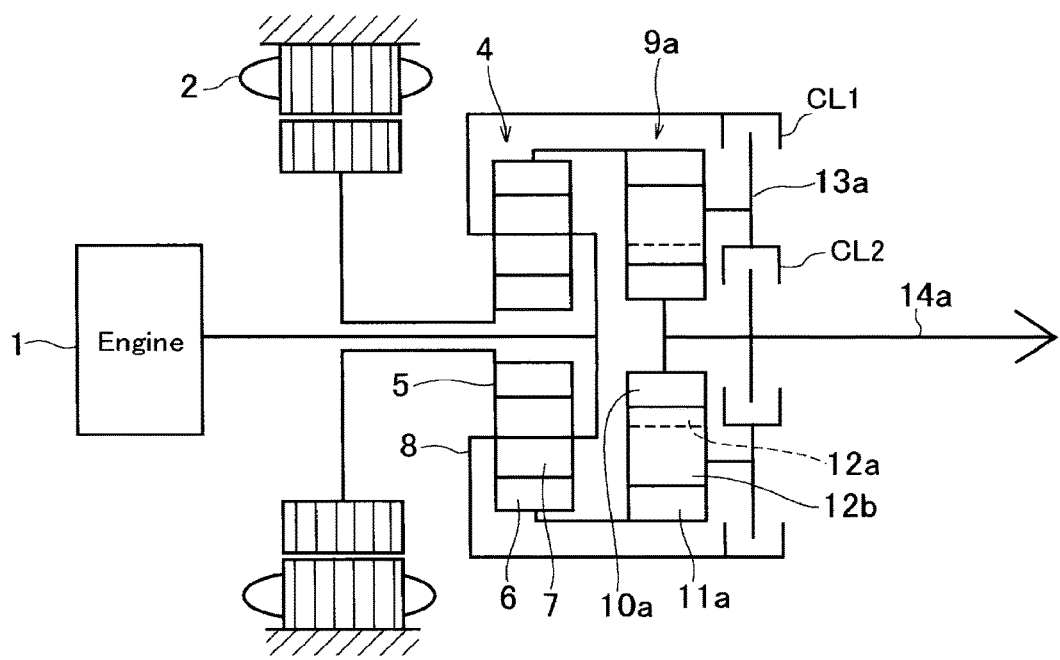
FIG. 16 is a schematic diagram showing a modification of the third embodiment adapted to be applied to a front-engine, rear-wheel-drive layout vehicle.

Turning to FIG. 16, there is shown a modification of the third embodiment shown in FIG. 14. In the drive unit shown in FIG. 16, the second sun gear 10a of the second planetary gear unit 9a is used as an output element, and the second carrier 13a of the second planetary gear unit 9a is connected to the first carrier 8 of the power distribution device 4. Accordingly, an output shaft 14a extending in the opposite direction to the engine 1 on which the second sun gear 10a is fitted serves as an output element. Although omitted in FIG. 16, a torque of the second motor 3 is applied to the output shaft 14a. That is, the drive unit shown in FIG. 16 is adapted to be applied to a front-engine, rear-wheel-drive layout vehicle (i.e., an FR layout vehicle). To this end, in the drive unit shown in FIG. 16, the first motor 2, the power distribution device 4, the second planetary gear unit 9a, the first clutch CL1, and the second clutch CL2 are arranged in a downstream side of the engine 1 in the order shown in FIG. 16.

An operating mode of the drive unit shown in FIG. 16 may also be selected from the EV mode, the high mode of hybrid mode, the low mode of hybrid mode and the direct mode, and operating conditions of the drive unit shown in FIG. 16 under the high mode and the low mode may be indicated by switching positions of the second sun gear 10a and the second carrier 13a of the second planetary gear unit 9a in the nomographic diagram shown in FIG. 15. In the drive unit shown in FIG. 16, the distribution ratio of the engine power to the output gear 14 under the low mode can be expressed as "$1/\rho 1$", and the distribution ratio of the engine power to the output gear 14 under the high mode can be expressed as "$\rho 2/\rho 1$".

Figure 17:
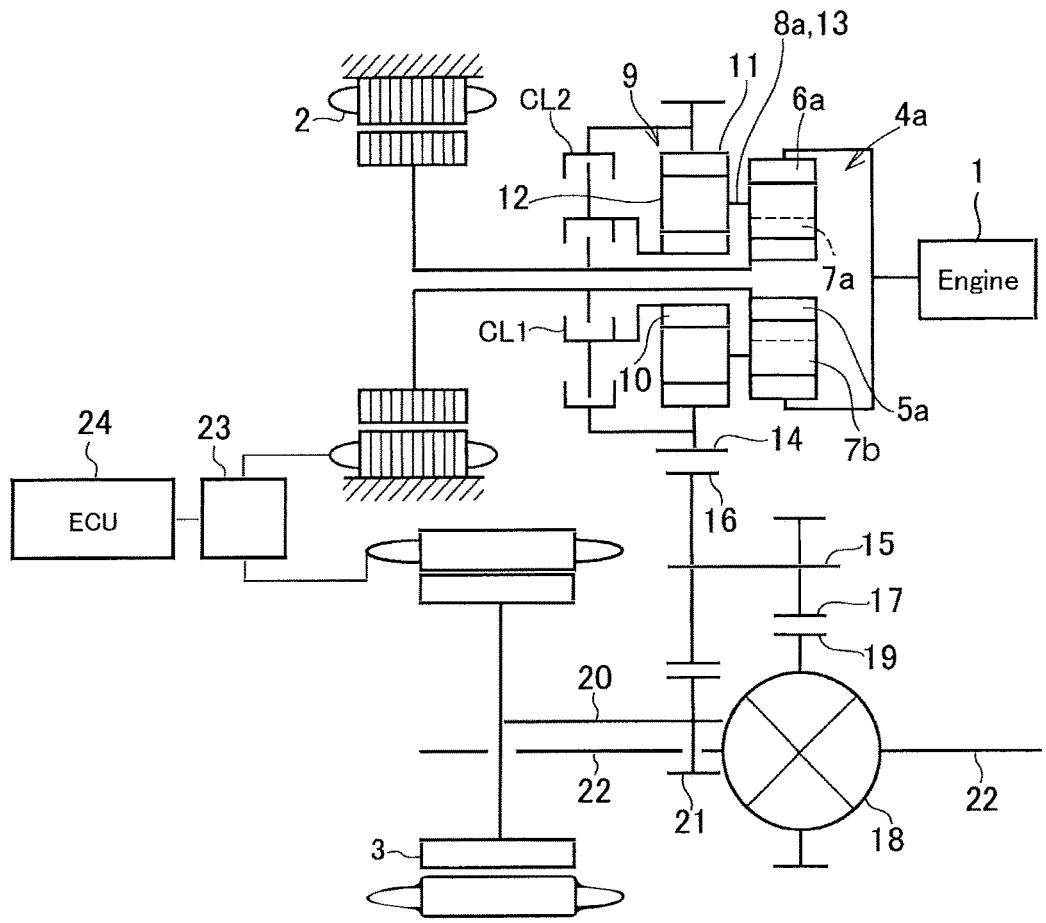
FIG. 17 is a schematic diagram showing fourth embodiment of the present application in which a double-pinion planetary gear unit is used as the power distribution device.

Turning to FIG. 17, there is shown a fourth embodiment in which a double-pinion planetary gear unit is used as the power distribution device 4a. Specifically, the power distribution device 4a comprises a first sun gear 5a, first pinion gears 7a meshed with the first sun gear 7a, second pinion gears 7b interposed between the first pinion gears 7a and a first ring gear 6a, and a first carrier 8a supporting the first pinion gears 7a and the second pinion gears 7b. Unlike the first embodiment shown in FIG. 1, according to the fourth embodiment, the power distribution device 4a is disposed between the engine 1 and the second planetary gear unit 9, and power of the engine 1 is applied to the first ring gear 6a as an input element. The first carrier 8a is connected to the second carrier 13 of the second planetary gear unit 9 as a single-pinion planetary gear unit, and remaining structures are similar to those of the drive unit shown in FIG. 1. Specifically, the first sun gear 5a of the power distribution device 4a is connected to the first motor 2. The first clutch CL1 is disposed between the first sun gear 5a and the second sun gear 10 of the second planetary gear unit 9, and the second clutch CL2 is disposed between the second sun gear 10 and the second ring gear 11 of the second planetary gear unit 9. Thus, the clutches CL1 and CL2 are disposed between the second planetary gear unit 9 and the first motor 2.

An operating mode of the drive unit shown in FIG. 17 may also be selected from the EV mode, the high mode of hybrid mode, the low mode of hybrid mode and the direct mode, and engagement states of the clutches CL1 and CL2 under each operating mode are identical to those shown in FIG. 2. Specifically, the EV mode is established by bringing both of the clutches CL1 and CL2 into disengagement, and the direct mode is established by bringing both of the clutches CL1 and CL2 into engagement. Likewise, in the hybrid mode, the high mode is established by bringing the first clutch CL1 into engagement, and the low mode is established by bringing the second clutch CL2 into engagement. Operating condition of the drive unit shown in FIG. 17 under the EV mode and the direct mode are similar to those of the drive unit shown in FIG. 1.

Figure 18:
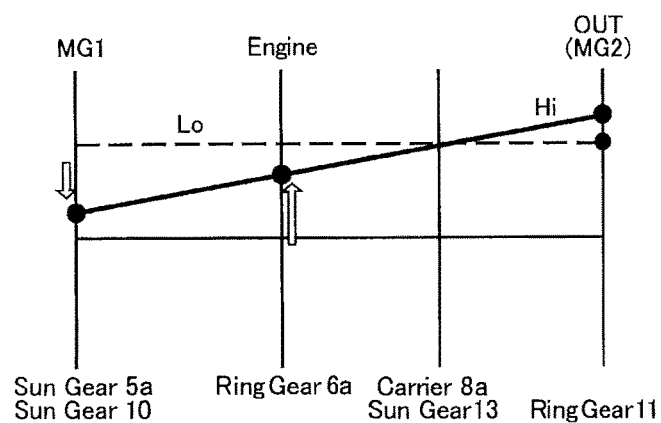
FIG. 18 is a nomographic diagram showing a situation in the drive unit shown in FIG. 17 under the high mode and the low mode.

Operating conditions of the drive unit shown in FIG. 17 under the high mode and the low mode are indicated in the nomographic diagram shown in FIG. 18. In FIG. 18, the solid line represents the high mode, and the dashed line represents the low mode. In the high mode, the first clutch CL1 is brought into engagement so that the first sun gear 5a of the power distribution device 4a is connected to the second sun gear 10 of the second planetary gear unit 9 to combine the power distribution device 4a with the second planetary gear unit 9. In this situation, the first carrier 8a of the power distribution device 4a connected to the second sun gear 10 serves as a reaction element, the first ring gear 6a of the power distribution device 4a serves as an input element, and the second ring gear 11 of the second planetary gear unit 9 serves as an output element of the complex planetary gear unit. In this case, given that the power of the engine 1 distributed to the first motor 2 is "1", the distribution ratio of the engine power to the output gear 14 can be expressed as "$(1-\rho 1)/(\rho 1+\rho 2)$".

In the low mode, the second clutch CL2 is brought into engagement so that the second planetary gear unit 9 is rotated integrally. In this situation, the power is delivered from the first carrier 8a of the power distribution device 4a to the second planetary gear unit 9. Consequently, a rotational speed of the second ring gear 11 of the second planetary gear unit 9 serving as an output element is lowered to a same speed as the first carrier 8a of the power distribution device 4a. Under the low mode, since a rotational speed of the second ring gear 11 is thus lowered in comparison with that under the high mode, the speed ratio is increased in the amount of such reduction in the rotational speed of the second ring gear 11. In this case, given that the power of the engine 1 distributed to the first motor 2 is "1", the distribution ratio of the engine power to the output gear 14 can be expressed as "$(1-\rho 1)/\rho 1$".

Figure 19:
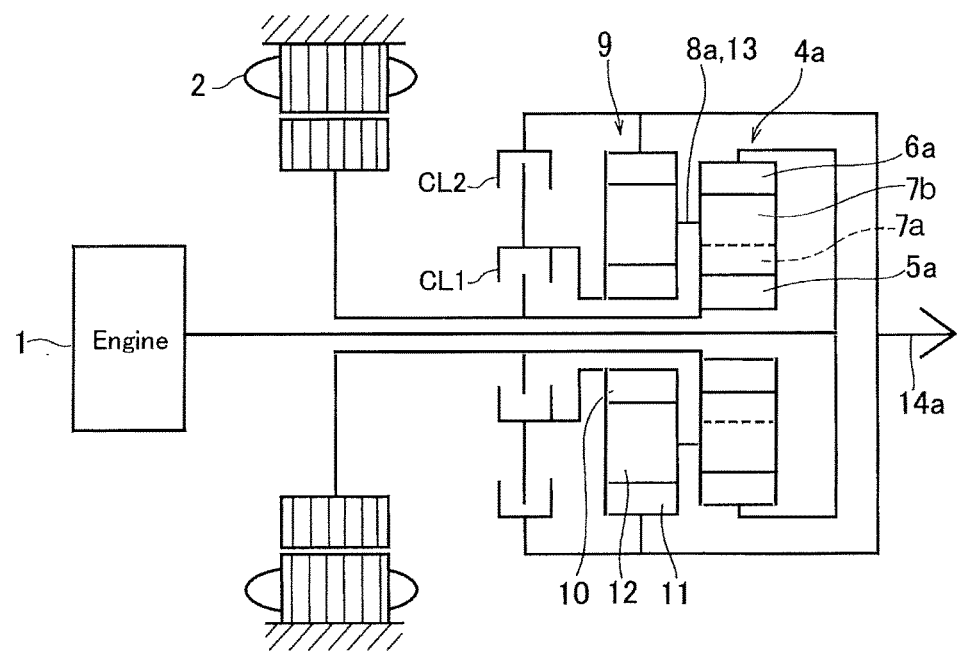
FIG. 19 is a schematic diagram showing a modification of the fourth embodiment adapted to be applied to a front-engine, rear-wheel-drive layout vehicle.

Turning to FIG. 19, there is shown a modification of the fourth embodiment shown in FIG. 17 that is adapted to be applied to an FR layout vehicle. In the drive unit shown in FIG. 19, the engine 1 is disposed on an opposite side to the first clutch CL1, the second clutch CL2, the second planetary gear unit 9 etc. across the first motor 2, and the output shaft 14a extends in the opposite direction to the engine 1 along the rotational center from the power distribution device 4a. Although omitted in FIG. 19, a torque of the second motor 3 is applied to the output shaft 14a.

In the drive unit shown in FIG. 19, an arrangement of the constitutional elements are altered based on the drive unit shown in FIG. 17. Accordingly, an operating mode of the drive unit shown in FIG. 17 may also be selected from the EV mode, the high mode of hybrid mode, the low mode of hybrid mode and the direct mode, and the speed ratio and the power distribution ratio under the hybrid mode is identical to those of the drive unit shown in FIG. 17.

Figure 20:
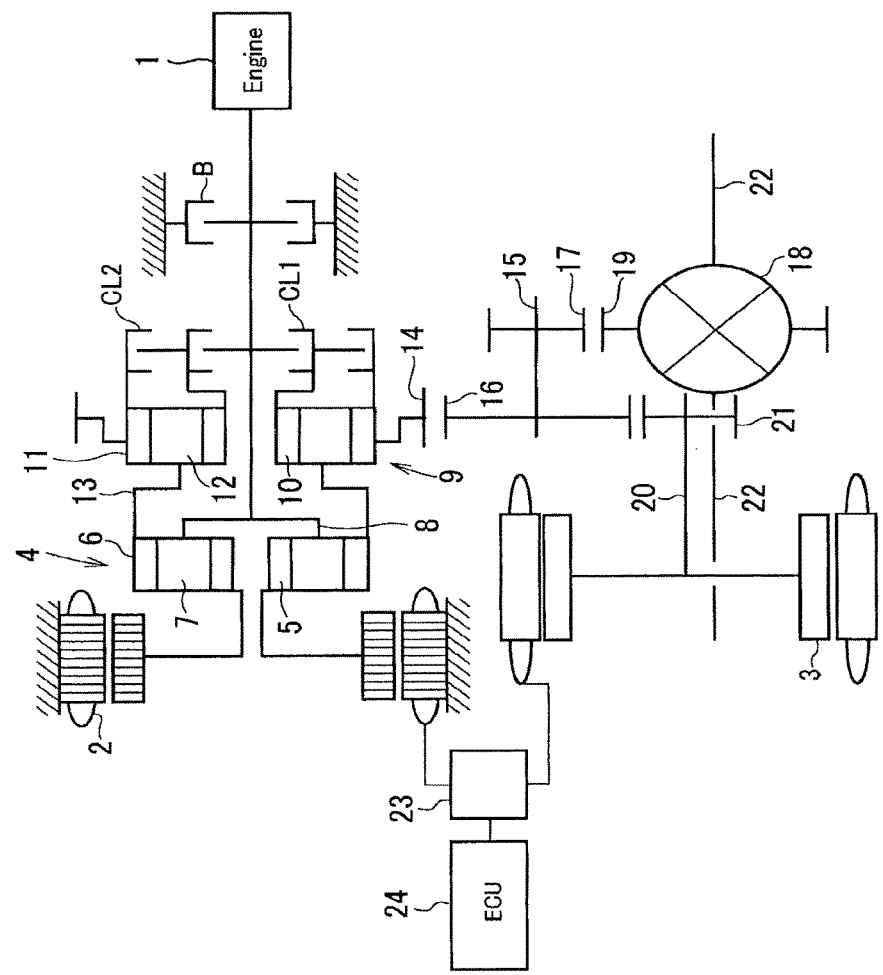
FIG. 20 is a schematic diagram showing a fifth embodiment as a modification of the first embodiment shown in FIG. 1 in which a brake device is employed.

Turning to FIG. 20, there is shown a fifth embodiment of the drive unit as a modification of the first embodiment shown in FIG. 1. In the drive unit shown in FIG. 20, a brake B is disposed between the engine 1 and the power distribution device 4 to selectively halt a rotation of the first carrier 8 as an input element of the power distribution device 4 to which the engine power is applied. Specifically, the brake B is brought into engagement to establish a reaction force by the first carrier 8 during propelling the vehicle by an output torque of the first motor 2 while stopping the engine 1. To this end, a friction brake, a dog brake, a one-way clutch etc. adapted to stop a counter rotation of the first carrier 8 opposite to the rotational direction of the engine 1 may be used as the brake B.

Figure 21:
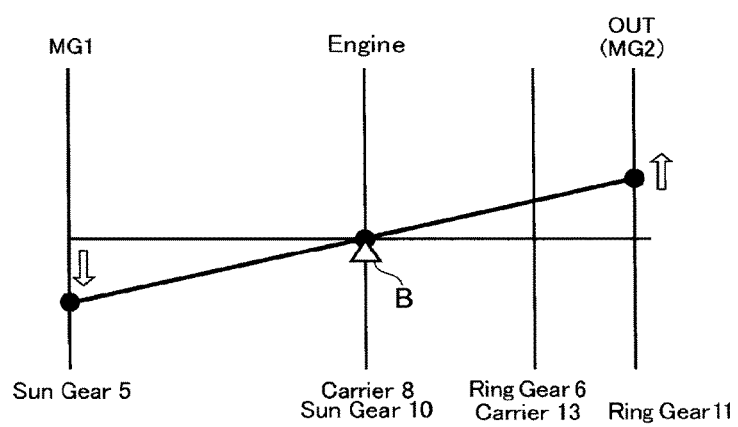
FIG. 21 is a nomographic diagram showing a situation in the drive unit shown in FIG. 20 under the high mode and the low mode.

In the drive unit thus provided with the brake B, the vehicle is allowed to be propelled by a driving force of the first motor 2 driven by the electric power from the electric power source 23 while stopping the engine 1. In this situation, a casing serves as a reaction element receiving a reaction force resulting from rotating the first motor 2 in the counter direction through the brake B. In this case, optionally, the vehicle is allowed to be propelled under dual-motor mode of the EV mode by adding a driving force generated by the second motor 3 to the driving force generated by the first motor 2. Operating conditions of the drive unit shown in FIG. 20 under the dual-motor mode is indicated in the nomographic diagram shown in FIG. 21. In the dual-motor mode, the first motor 2 is rotated in the counter direction and hence a torque is applied to the first carrier 8 in the counter direction. As described, the brake B is brought into engagement to halt the first carrier 8 in the dual-motor mode, and consequently the first ring gear 6 is rotated in the forward direction as the rotational direction of the engine 1 by the torque of the first motor 2. In this situation, torque of the first ring gear 6 is delivered to the output gear 14 via the second planetary gear unit 9 by bringing at least one of the clutches CL1 and CL2 into engagement. In addition, torque of the second motor 3 is added to the torque delivered from the output gear 14 to propel the vehicle.

Thus, according to the embodiment shown in FIG. 20, the first motor 2 may be used as a prime mover to propel the vehicle to increase selectable operating modes so that the vehicle can be propelled more properly in line with a driving condition or a required driving force. In addition, energy efficiency may also be improved. Optionally, the brake B may also be used in the drive units shown in FIGS. 10, 14, 16, 17 and 19.

Although the above exemplary embodiments of the present application have been described, it will be understood by those skilled in the art that the present application should not be limited to the described exemplary embodiments, and various changes and modifications can be made within the spirit and scope of the present application. For example, in the embodiment in which the single-pinion planetary gear unit is used as the power distribution device 4, the first motor 2 may also be connected to the first ring gear 6 while connecting the first sun gear 5 to the second input element of the second planetary gear unit 9. In this case, the first ring gear 6 serves as the first input element, and the first sun gear 5 serves as the first output element.

In addition, in order to integrally rotate the second planetary gear unit 9, the second clutch CL2 may also be adapted to halt rotations of any two of or all of the rotary elements such as the sun gear, the carrier and the ring gear. Further, the driving force generated by the second motor 3 may also be delivered to the wheels other than the wheels to which the driving force generated by the first motor 2 is delivered.

What is claimed is:

1. A drive unit for a hybrid vehicle, in which an output power of an engine is distributed, the drive unit comprising:
    a first motor having a generating function;
    a power distribution device between the engine and the first motor including an output member that outputs torque input by the engine and input by the first motor;
    a second motor that generates torque to propel the hybrid vehicle,
    wherein the power distribution device includes
        a first planetary gear unit that performs a differential action among a first input element to which the output power of the engine is applied, a first reaction element connected to the first motor, and a first output element;
        a second planetary gear unit that performs a differential action among a second input element connected to the first output element, a second output element connected to the output member, and a second reaction element;
        a first clutch that selectively connects one of the first input element and the first reaction element to the second reaction element; and
        a second clutch that selectively connects two of the second input element, the second output element, and the second reaction element to rotate the second planetary gear unit integrally,
    wherein the second motor adds torque to an output torque output from the output member.

2. The drive unit for a hybrid vehicle as claimed in claim 1,
    wherein the first planetary gear unit includes a single pinion planetary gear unit comprising a first sun gear, a first ring gear arranged concentrically with the first sun gear, and a first carrier supporting pinion gears meshing with the first sun gear and the first ring gear; and
    wherein the first reaction element includes one of the first sun gear and the first ring gear, and the first output element includes an other of the first sun gear and the first ring gear.

3. The drive unit for a hybrid vehicle as claimed in claim 2,
    wherein the second planetary gear unit includes a single pinion planetary gear unit comprising a second sun gear, a second ring gear arranged concentrically with the second sun gear, and a second carrier supporting pinion gears meshing with the second sun gear and the second ring gear;
    wherein the first ring gear is connected to the second carrier; and
    wherein the first clutch connects the first carrier to the second sun gear.

4. The drive unit for a hybrid vehicle as claimed in claim 1,
    wherein the first planetary gear unit and the second planetary gear unit are arranged in tandem in an axial direction; and
    wherein the first clutch and the second clutch are arranged coaxially on opposite sides across the first planetary gear unit and the second planetary gear unit.

5. The drive unit for a hybrid vehicle as claimed in claim 1, further comprising:

an electronic control unit that controls the engine, the first motor, the second motor, the first clutch and the second clutch; and wherein the electronic control unit is configured to bring the first clutch and the second clutch into engagement, and to operate the engine, the first motor and the second motor in such a manner as to generate driving forces.

6. The drive unit for a hybrid vehicle as claimed in claim 1, further comprising:

a brake that selectively halts a rotation of the first input element.

* * * * *